Nov. 28, 1967     F. F. SALZMANN     3,354,498
TRAVERSE ROD MASTER CARRIER
Filed April 29, 1966
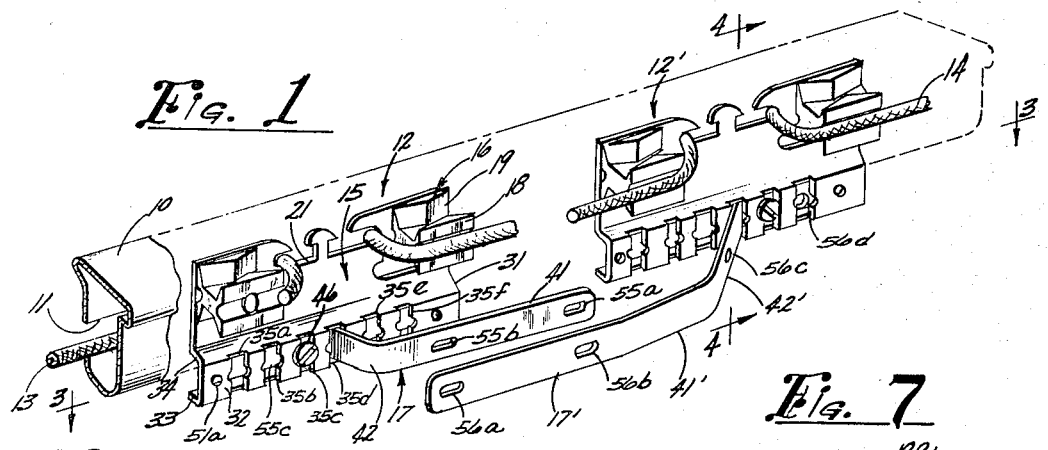
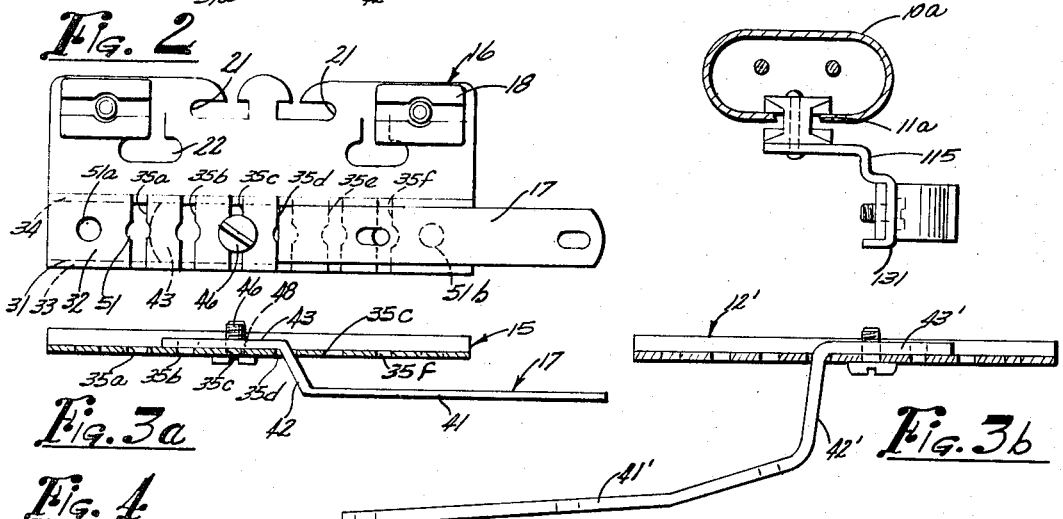
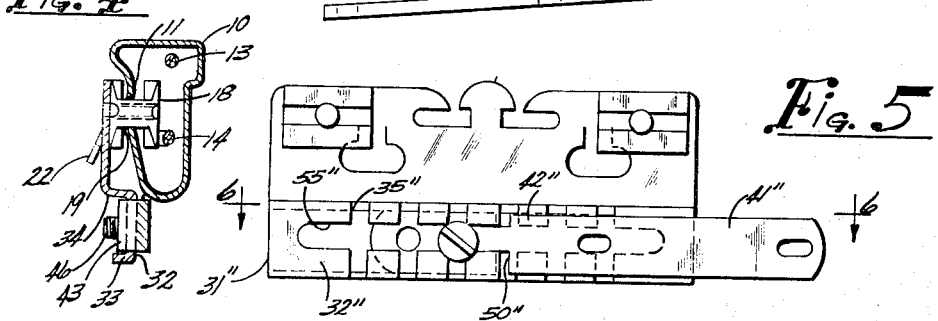
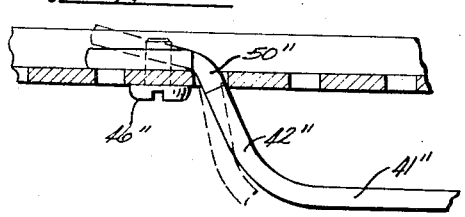
INVENTOR
Ferdinand F. Salzmann
By McCanna, Morsbach & Pillote
ATTORNEY.

United States Patent Office 3,354,498
Patented Nov. 28, 1967

3,354,498
TRAVERSE ROD MASTER CARRIER
Ferdinand F. Salzmann, Madison, Wis., assignor to Graber Manufacturing Company, Inc., Middleton, Wis., a corporation of Wisconsin
Filed Apr. 29, 1966, Ser. No. 546,348
12 Claims. (Cl. 16—87.4)

This invention relates to drapery traverse rod and master carrier therefor.

As is well known, drapery traverse rods can be arranged for various different traverse arrangements and including the so-called one-way draw rod; two-way draw rods and multiple draw rods. In these different traverse rod arrangements, it is frequently desirable to adjust the distance that the drapery support arm projects lengthwise from the master carrier, for example to adjust the master coverage range in a one-way draw, or to adjust the amount of drapery overlap in a two-way draw. It is, moreover, frequently desirable to reverse the drapery support arm on the master carrier body, as when reversing the direction of a one-way draw rod or a multiple draw rod. In addition, in two-way draw rods it is sometimes desirable to reverse the overlap and underlap arms or even to remove one of the arms from its master carrier body.

An important object of this invention is to provide an improved traverse rod master carrier in which the master carrier arm is adjustable in increments along the length of the carrier body to enable adjustment of the amount of lap.

Another object of this invention is to provide an improved master carrier for a drapery traverse rod in which the master carrier arm can be reversibly positioned on the master carrier body, intermediate the ends of the latter, to enable use of the master carrier for draw in either direction.

Another object of this invention is to provide a master carrier in which the master carrier arm can be adjusted or reversed after the drapery is installed and from a position at the front side of the drapery rod.

Still another object of this invention is to provide an improved master carrier wherein the master carrier arm is adjustable to a plurality of positions along the master carrier body and lockable in its adjusted position by a screw, and which does not require a separate tapped hole for each of the adjusted positions of the master carrier arm.

Yet another object of this invention is to provide a master carrier having a drapery support arm which is adjustable to different positions therealong and lockable in its adjustable position by a screw, and wherein the drapery support arm will not slip out of its adjusted position in the event the screw becomes slightly loose.

Still another object of this invention is to provide a master carrier for a traverse rod wherein the same master carrier body can be used for both the underlap and overlap drapery support arms, to thereby minimize the number of parts which must be fabricated and to facilitate reversal of the drapery rod master carrier.

These, together with other objects and advantages of this invention will be more readily appreciated as the same becomes better understood by reference to the following detailed description wherein:

FIGURE 1 is a fragmentary perspective view of a traverse rod having the improved master carrier of the present invention mounted thereon, and with parts of the traverse rod broken away and shown in phantom;

FIG. 2 is a front elevational view of a master carrier embodying the present invention;

FIGS. 3a and 3b are horizontal sectional views through the master carriers, taken on the plane 3—3 of FIG. 1;

FIG. 4 is a transverse sectional view taken on the plane 4—4 of FIG. 1;

FIG. 5 is a front elevational view of a modified form of master carrier;

FIG. 6 is a fragmentary sectional view taken on the plane 6—6 of FIG. 5 and illustrating parts on a larger scale; and FIG. 7 is a transverse sectional view illustrating the master carrier of the present invention applied to a modified form of traverse rod.

As is conventional, a traverse rod includes an elongated rod, one or more master carriers for supporting and moving a drapery adjacent one edge thereof, a plurality of auxiliary carriers for supporting intermediate portions of the drapery on the rod, and a traverse mechanism commonly in the form of a traverse cord which is entrained over pulleys adjacent the ends of the traverse rod and which is connected to the master carrier or carriers to move the same along the rod. Such traverse rods are in general well known and detailed illustration and description thereof is deemed unnecessary.

The drapery rod master carrier of the present invention can be adapted for use with different types of rods and is shown in FIGS. 1 and 4 applied to a rod 10 of the type having a slot or trackway 11 in the rear side thereof, and is shown in FIG. 7 applied to a rod 10a having a slot or trackway 11a at the underside thereof. It is to be understood that the master carrier could be adapted for use on other forms of drapery rods, if desired. Moreover, the drapery rod master carrier can be used in various different types of installation such as the so-called one-way draw in which a single master carrier is employed; the two-way draw in which a pair of master carriers are employed and moved in relatively opposite directions by the traverse mechanism, as well as in multiple draw installations employing two or more master carriers or sets of master carriers at different points along the rod.

In the embodiment shown in FIG. 1, a pair of master carriers designated 12 and 12' are illustrated and arranged for two-way draw operation as through a traverse mechanism including cords 13 and 14. In such a two-way draw installation, the traverse cords 13 and 14 are connected to the slides and entrained over pulleys (not shown) usually adjacent the ends of the rod in such a manner that the cords are operable to simultaneously move the master carriers in relatively opposite directions toward or away from each other. Auxiliary slides (not shown) are commonly provided in the trackway for supporting intermediate portions of the upper edge of the drapery. In general, the drapery rod master carriers each include a carrier body 15, a guide means 16 for mounting the carrier body on the traverse rod, and a drapery support arm 17. The master carrier bodies are advantageously so constructed that the same body 15 can be used not only for both the underlap and overlap master carriers such as 12 and 12' in a two-way draw installation, but also as the single or multiple master carriers in one-way and multiple draw installations. Different drapery support arms are advantageously provided for interchangeable use on the master carrier bodies, to adapt the same for use in different installations and, as shown, the overlap arm 17' is formed so that its drapery supporting portion is offset a greater distance than that of the underlap arm 17 to enable the arms to move into overlapping relation when the carriers are drawn together.

The guide means 16 for mounting the master carriers on the traverse rod can be of any conventional construction and may, for example, be in the form of slide buttons 18 having grooves 19 for slidably receiving the portions of the rod adjacent the trackway 11. Alternatively, rollers or the like may be provided for supporting the master carrier on the traverse rod. Further, any suitable means may be provided for connecting the traverse mechanism to the master carriers and, in the embodiment shown, the master carriers have a cord lock of the type shown in the patent to J. N. Graber et al. No. 3,192,995. In general, the cord lock includes cord receiving openings 21 in the slide body arranged to allow an intermediate portion or end portions of the cord to be drawn from the rod through the cord openings to the outer side of the master slide, and a pair of cord locks 22 on the master carrier arranged to engage the cord to lock the cord to the carrier body. Alternatively, any other suitable means for connecting the traverse mechanism to the master carrier may be employed, if desired.

Provision is made for mounting the drapery support arms on the master carriers to enable reversible positioning of the arms on the carriers and to also enable interchangeable use of other drapery support arms. In addition, the master carriers and drapery support arms are advantageously arranged to enable adjustment of the support arms in small increments along the length of the master carrier, for adjustment of the amount of drapery lap. Since the traverse rods when mounted over a window frequently have limited clearance at the rear side thereof, the adjustable drapery support arm is advantageously so arranged as to enable adjustment and locking of the arm in its adjusted position from the front side of the master carrier.

The master carrier bodies 15 are formed with an elongate arm mounting portion 31 for adjustably supporting the drapery support arms 17. For reasons pointed out hereinafter, this arm mounting portion 31 is advantageously made in the form of an elongated channel which includes a web section 32 and flanges 33 and 34 extending rearwardly from opposite edges of the web section. As used herein, the term "front" refers to the side of the master carrier at which the draperies are hung and the term "rearwardly" means away from the front or drapery side of the master carrier. The web section 32 is formed with a plurality of like slots at spaced points therealong, herein shown six in number and designated 35a–35f. Obviously, a greater or lesser number of slots may be provided, if desired. The slots are made relatively narrow for reasons pointed out hereinafter and have their major dimension extending crosswise of the web section 32 of the arm mounting portion. It is desired that the opening defined by the slots be at least equal to the spacing between the flanges 33 and 34 of the channel-shaped arm mounting portion and, for convenience in forming the same, the slots are preferably extended somewhat beyond the inner faces of the flanges. While the slots can be formed in any suitable manner, they are conveniently formed by punching prior to or during formation of the channel-shaped arm mounting portion of the carrier body.

The drapery support arm 17 has an elongated portion 41 for supporting a drapery at the front side of the master carrier; an intermediate portion 42 which is arranged to extend laterally through any one of the selected openings 35a–35f, and an end portion 43 which overlaps the rear side of the arm mounting section of the master carrier. The drapery support arm is advantageously formed from a strap having a generally uniform width and thickness along its length and, as will be seen from FIGS. 2 and 3, the end portion 43 has a cross-section no greater than that of the openings 35a–35f so as to be insertable and removable therethrough. Moreover, the width of the end portion 43 advantageously corresponds generally to the spacing between the flanges 33 and 34 of the mounting portion so that the end portion is guidably received therebetween. The drapery support arm is secured in adjusted position by a screw fastener 46 which can be inserted and removed from the front of the master slide and, as shown, the fastener has a head which overlies the front face of the mounting portion and a threaded shank that extends through the web section of the mounting portion and is threaded into an opening 48 in the end portion 43 of the arm (FIG. 3A). The web section 32 is formed with openings to allow the passage of the shank of the screw therethrough in each of the adjusted positions of the drapery support arm. While these openings can be formed entirely separate from the slots 35a–35f, the opening 48 in the end portion of the drapery support arm is preferably arranged to approximately align with one of the slots in the mounting portion, when the support arm is inserted through a different one of the slots. This is achieved by making the spacing of the opening 48 relative to the intermediate portion 42 of the drapery support arm a distance approximating the spacing of adjacent slots, or a multiple of this spacing. Openings designated 51 are thus formed in the web section to intersect the respective slots 35a–35f, and allow passage of the screw shank therethrough. Additional openings 51a and 51b are formed in the web section adjacent relatively opposite ends to register with the arm opening 48, when the arm is positioned in the end slots.

The overlap arm 17' is constructed and mounted in the same manner as the underlap arm 17 and differs therefrom in that the drapery support portion 41' is offset from the end portion 43' a distance somewhat greater than that of the underlap arm, to provide the desired clearance between the drapery support portions 41 and 41' of the overlap and underlap arms. Drapery hook receiving openings 55a and 55b are preferably provided in the drapery support portion 41 of the underlap arm and an additional opening 55c is advantageously provided in the end portion 43' and arranged to register with one of the slots to allow insertion of the drapery hook through the opening 55c. This provides a hook receiving opening 55c which has the same spacing relative to the openings 55d and 55a in all adjusted positions of the drapery support arm. Similarly, the overlap arm has a plurality of drapery hook receiving openings, herein shown four in number, including openings 56a–56c in the drapery support portion 41' and intermediate portion 42' and an opening 56d in the end portion 43'. Again, the opening 56d is advantageously arranged so as to register with one of the slots to allow insertion of a drapery hook therethrough.

The drapery rod master carrier shown in the embodiment of FIGS. 5 and 6 is generally similar to that shown in FIGS. 1–4 and like numerals followed by the subscript double prime (") are used to designate corresponding parts. In this embodiment, the arm mounting portion 31" is also advantageously of channel configuration with cross slots 35" at spaced points along the web section 32". In this embodiment, however, the screw receiving openings are advantageously formed by a continuous longitudinal slot 55" which extends longitudinally of the web portion and intersects the cross slots 35". This allows the screw to slide along the length of the mounting portion when it is loosened and the intermediate portion 42" of the drapery support arm is notched at its opposite edges, as shown at 50" to a depth sufficient to allow the intermediate portion to move through the slot 55". The notches 50" in the drapery support arm are advantageously shaped as shown in FIG. 6 so that the intermediate portion engages the slots when the fastener 46" is tightened, but the notches clear the slots when the fastener is loosened and the arm tilted relative to the carrier as shown in phantom in FIG. 6.

As previously mentioned, the master slide is adapted for use with different types of traverse rods and is shown in FIG. 7 applied to a traverse rod 10a having a downwardly opening trackway 11a. The previously described drapery rod master carrier can conveniently be adapted for such a trackway by angulating the carrier body as shown at 115 in FIG. 7 so that the drapery arm mounting portion 131 extends generally perpendicular to the plane of the trackway, instead of generally parallel thereto as in the preceding forms.

The use and operation of the improved drapery rod master carrier has been indicated in the foregoing description of the construction of the device. The drapery support arms can be reversed, interchanged or adjustably mounted in any one of the slots along the length of the master carrier from a position at the front of the rod. Moreover, only a single threaded opening 48 is required since this opening in the end portion 43 of the overlap arm receives the fastener in each of the adjusted or reverse positons of the arm. This simplifies and reduces the cost of manufacture of the master carrier. Moreover, the slots in the carrier body positively locate the master carrier arm on the body and inhibit endwise movement of the arm even if the screw should become loosened. The flanges 34 and 33 engage the end portion 43 of the arm in each of the adjusted positions thereof to inhibit swinging movement of the arm.

While preferred embodiments of the invention have been shown and described herein to illustrate the invention, it should be understood that other modifications and variations of the invention may be employed without departing from the principles and scope of the invention defined in the appended claims.

I claim:

1. In a master carrier for a drapery traverse rod including a master carrier body, means for guidably mounting the carrier body on a traverse rod, and a drapery support arm, means for adjustably and reversibly mounting the drapery support arm on the carrier body comprising: an elongate arm mounting portion on the carrier body extending generally lengthwise of its direction of movement and having a plurality of slots extending crosswise of said mounting portion and arranged in a row along the length of the mounting portion, said drapery support arm including a first elongate portion disposed at one side of said arm mounting portion for supporting a drapery; an intermediate portion extending laterally from said first elongate portion through any selected one of said slots; and a second end portion overlapping the other side of said arm mounting portion, each of said crosswise slots defining openings at least as large as the cross section of said second end portion of said arm to enable insertion of the same through any of said slots for adjustable positioning of the arm at a plurality of different positions along the carrier body, and fastener means detachably securing said second end portion of said arm to said arm mounting portion of the body.

2. A master carrier according to claim 1 wherein said first elongate portion and said second end portion extend in relatively opposite directions from said intermediate portion of said arm.

3. A master carrier according to claim 1 wherein said fastener means comprises a screw having a head at said one side of said arm mounting portion, said screw extending through said arm mounting portion and threadedly engaging said second end portion of said arm.

4. A master carrier according to claim 1 wherein said second end portion has a screw receiving opening spaced from said intermediate portion of the arm, said mounting portion having aperture means which register with said screw receiving opening in said second end portion when the intermediate portion of the arm extends through any selected one of said slots, and said fastener means comprises a screw having a head at said one side of said arm mounting portion, said screw extending through said aperture means and threadedly extending into said opening in said second end portion of the arm.

5. A master carrier according to claim 4 wherein said aperture means comprises a plurality of openings in said arm mounting portion spaced apart along the length thereof a distance approximating the spacing of said slots.

6. A master carrier according to claim 5 in which said openings in said arm mounting portion intersect said slots.

7. A master carrier according to claim 4 wherein said aperture means comprises a longitudinal slot in said mounting portion intersecting said transverse slots, said intermediate portion of said arm being notched to allow movement of said intermediate portion through said longitudinal slot in a direction lengthwise of said arm mounting portion when said screw is loosened.

8. A master carrier according to claim 1 wherein said carrier body has means defining shoulders extending laterally from said other side of said arm mounting portion adjacent the ends of said crosswise slots for engagement with said second end portion of the arm.

9. A master carrier for a drapery traverse rod comprising, a master carrier body having an elongate arm mounting portion, means for guidably mounting said carrier body on a traverse rod for movement in a directional generally paralleling the length of said elongate arm mounting portion, said arm mounting portion having at least one opening intermediate its ends, a drapery support arm including a first elongate portion offset from one side of said arm mounting portion; an intermediate portion extending laterally from one end of said first portion through said one opening; and a second end portion on said intermediate portion laterally offset from said first portion and overlying the other side of said arm mounting portion, said second portion being dimensioned for insertion through said one opening and for mounting in either first or second relatively opposite positions at said other side of said mounting portion to reversibly support said first drapery support portion, said second portion having a screw receiving opening therein spaced from said intermediate portion, and said arm mounting portion having at least two other openings therein at relatively opposite sides of said one opening and each positioned to register with said screw receiving opening in said second end portion in one position thereof, and a screw having its head at said one side of said mounting portion, said screw extending through one of said other openings and threaded into said screw opening in said second portion of said arm to detachably secure said arm to said mounting portion.

10. A master carrier for a drapery traverse rod comprising, a master carrier body having an elongate channel-shaped portion, means for guidably mounting said carrier body on a traverse rod for movement in a direction generally paralleling the length of said channel-shaped portion, said channel-shaped portion having a web section and flanges along opposite edges of said web section at a rear side thereof, said web section having a plurality of narrow slots extending crosswise of the web section between said flanges and spaced along the length thereof, a drapery support arm including a first elongate drapery support portion offset from the front side of the channel portion; an intermediate portion extending through any selected one of said slots; and a second end portion overlapping the rear side of said web section between said flanges, and a fastener extending through said web section and threadedly engaging said second end portion of the arm.

11. A master carrier according to claim 10 wherein said second end portion of said arm has an opening for threadedly receiving said fastener, said opening being spaced from said intermediate portion a distance to approximately align with one of said slots spaced from the slot through which said intermediate portion is inserted.

12. In a traverse rod including means defining a trackway, a master carrier body having means guidably mounting the same on said trackway for movement therealong, said carrier body having an arm mounting portion generally paralleling said trackway and a plurality of slots spaced apart along the length of said arm mounting portion and extending crosswise thereof, and a drapery support arm having a first drapery supportion portion extending generally lengthwise of said trackway at one side of said arm mounting portion; an intermediate portion extending from said drapery support portion through one of said slots; and a second end portion extending from said intermediate portion along the other side of said arm mounting portion, and a fastener extending through said arm mounting portion and engaging said second end portion of the arm.

References Cited

UNITED STATES PATENTS

| | | | |
|---|---|---|---|
| 73,808 | 1/1868 | Hodges | 248—496 |
| 1,973,487 | 9/1934 | Kenney et al. | 160—126 |
| 3,040,373 | 6/1962 | Graber et al. | 16—93 |

FRANCIS K. ZUGEL, *Primary Examiner.*

J. H. McGLYNN, *Assistant Examiner.*